(12) United States Patent
Vignali

(10) Patent No.: US 12,337,975 B2
(45) Date of Patent: Jun. 24, 2025

(54) LOW PRESSURE AIR CYCLE

(71) Applicant: Hamilton Sundstrand Corporation, Charlotte, NC (US)

(72) Inventor: Mark G. Vignali, Simsbury, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 282 days.

(21) Appl. No.: 17/948,880

(22) Filed: Sep. 20, 2022

(65) Prior Publication Data

US 2024/0092489 A1 Mar. 21, 2024

(51) Int. Cl.
*B64D 13/08* (2006.01)
*B60H 1/32* (2006.01)
*B64D 13/06* (2006.01)

(52) U.S. Cl.
CPC ............ *B64D 13/08* (2013.01); *B60H 1/3205* (2013.01); *B60H 1/3229* (2013.01); *B64D 2013/0618* (2013.01)

(58) Field of Classification Search
CPC ............ B64D 13/08; B64D 2013/0618; B64D 2013/0648; B64D 2013/0662; B64D 13/06; B60H 1/3205; B60H 1/3229; B64C 30/00
See application file for complete search history.

(56) References Cited

U.S. PATENT DOCUMENTS

| | | | |
|---|---|---|---|
| 9,580,180 B2 | 2/2017 | Jonqueres et al. | |
| 9,656,755 B2 | 5/2017 | Durbin et al. | |
| 9,994,323 B2 * | 6/2018 | Bruno | B64D 13/08 |
| 10,358,221 B2 | 7/2019 | Sautron | |
| 10,549,860 B2 | 2/2020 | Bruno et al. | |
| 10,745,136 B2 | 8/2020 | Bruno et al. | |
| 2015/0065025 A1 * | 3/2015 | Bruno | B64D 13/06 60/785 |
| 2015/0166187 A1 | 6/2015 | Durbin et al. | |
| 2015/0307195 A1 | 10/2015 | Bruno | |
| 2017/0305556 A1 | 10/2017 | Bruno | |
| 2018/0057170 A1 | 3/2018 | Sautron | |
| 2018/0057171 A1 | 3/2018 | Sautron | |
| 2019/0039738 A1 * | 2/2019 | Lo | B64D 13/06 |
| 2020/0298981 A1 | 9/2020 | Bruno | |
| 2023/0408153 A1 | 12/2023 | Vignali | |

OTHER PUBLICATIONS

Extended European Search Report for European Application No. 23198060.8; Report Mail Date Jan. 30, 2024 (14 Pages).

* cited by examiner

*Primary Examiner* — Kun Kai Ma
(74) *Attorney, Agent, or Firm* — CANTOR COLBURN LLP

(57) ABSTRACT

An environmental control system of a vehicle includes a first inlet configured to receive a flow of a first medium, a second inlet configured to receive a flow of a second medium, and a thermodynamic device including a compressor and at least one turbine operably coupled by a shaft. The compressor and the at least one turbine are fluidly coupled to the first inlet. The compressor and the at least one turbine are arranged in parallel relative to the flow of the first medium such that a first portion of the first medium is receivable at the compressor and a second portion of the first medium is receivable at the at least one turbine.

19 Claims, 1 Drawing Sheet

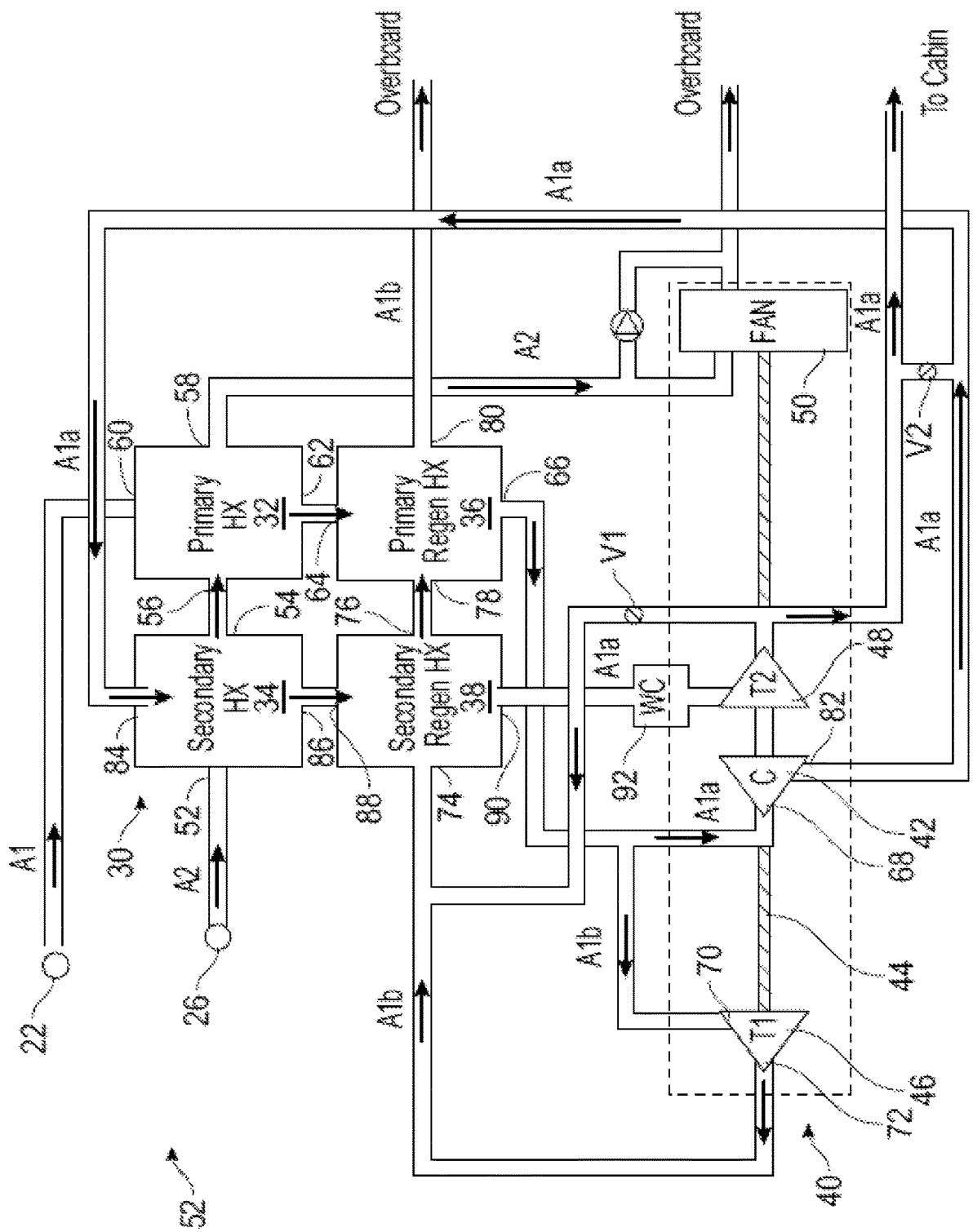

LOW PRESSURE AIR CYCLE

BACKGROUND

Exemplary embodiments pertain to the art of thermal management of a vehicle.

A typical commercial aircraft includes at least several nonintegrated cooling systems configured to provide temperature control to various regions of the aircraft. For example, an aircraft environmental control system primarily provides heating and cooling for the aircraft cabin area. In addition, a galley chiller system is dedicated to refrigerating the food carts in the galleys located throughout the aircraft. Since each system has a significant weight and power requirement, the overall efficiency of the aircraft is affected by these nonintegrated systems.

One of the more of these cooling systems may rely on ram or fresh air to condition, i.e., to cool or heat another medium. However, in applications where the aircraft is travelling at supersonic speeds, the temperature of the ram air may be too high to effectively remove heat from another load.

BRIEF DESCRIPTION

According to an embodiment, an environmental control system of a vehicle includes a first inlet configured to receive a flow of a first medium, a second inlet configured to receive a flow of a second medium, and a thermodynamic device including a compressor and at least one turbine operably coupled by a shaft. The compressor and the at least one turbine are fluidly coupled to the first inlet. The compressor and the at least one turbine are arranged in parallel relative to the flow of the first medium such that a first portion of the first medium is receivable at the compressor and a second portion of the first medium is receivable at the at least one turbine.

In addition to one or more of the features described herein, or as an alternative, in further embodiments comprising an outlet fluidly connected with one or more loads of the vehicle, wherein only the first portion of the first medium is provided to the outlet.

In addition to one or more of the features described herein, or as an alternative, in further embodiments comprising a cooling circuit including at least one cooling heat exchanger, the cooling circuit being fluidly connected to the second inlet.

In addition to one or more of the features described herein, or as an alternative, in further embodiments the thermodynamic device further comprises a fan mounted to the shaft and the fan is operable to move the flow of the second medium through the cooling circuit.

In addition to one or more of the features described herein, or as an alternative, in further embodiments the at least one cooling heat exchanger further comprises a primary heat exchanger and a secondary heat exchanger. A cooled flow inlet of the primary heat exchanger is arranged downstream from and is fluidly connected to a cooled flow outlet of the secondary heat exchanger relative to the flow of the second medium.

In addition to one or more of the features described herein, or as an alternative, in further embodiments a heated flow inlet of the secondary heat exchanger is arranged downstream from and is fluidly connected to a heated flow outlet of the primary heat exchanger relative to the flow of the first medium.

In addition to one or more of the features described herein, or as an alternative, in further embodiments a heated flow inlet of the secondary heat exchanger is arranged downstream from and is fluidly coupled to the compressor.

In addition to one or more of the features described herein, or as an alternative, in further embodiments comprising at least one regeneration heat exchanger arranged downstream from the at least one cooling heat exchanger relative to the flow of the first medium.

In addition to one or more of the features described herein, or as an alternative, in further embodiments the at least one regeneration heat exchanger further comprises a primary regeneration heat exchanger and a secondary regeneration heat exchanger. The primary regeneration heat exchanger is arranged downstream from the primary heat exchanger relative to the flow of the first medium, and the secondary regeneration heat exchanger is arranged downstream from the secondary heat exchanger relative to the flow of the first portion of the first medium.

In addition to one or more of the features described herein, or as an alternative, in further embodiments the at least one turbine further comprises a first turbine and a second turbine. The compressor and the first turbine are arranged in parallel relative to the flow of the first medium and the second turbine is arranged in series with the compressor relative to the first portion of the first medium.

In addition to one or more of the features described herein, or as an alternative, in further embodiments the vehicle is an aircraft.

In addition to one or more of the features described herein, or as an alternative, in further embodiments the vehicle is operable in a supersonic cruise condition.

According to an embodiment, a method of operating an environmental control system of a vehicle includes providing a thermodynamic device including a compressor and a first turbine operably coupled by a shaft, cooling a first medium with a cooling circuit via a second medium, compressing a first portion of the first medium within the compressor to form a compressed first portion of the first medium, expanding a second portion of the first medium at the first turbine to form an expanded second portion of the first medium, and cooling the first medium with the expanded second portion of the first medium.

In addition to one or more of the features described herein, or as an alternative, in further embodiments comprising expanding the compressed first portion of the first medium at a second turbine to form an expanded first portion of the first medium, the second turbine being operably coupled to the compressor and the first turbine by the shaft.

In addition to one or more of the features described herein, or as an alternative, in further embodiments comprising providing only the expanded first portion of the first medium to at least one load of the vehicle via an outlet.

In addition to one or more of the features described herein, or as an alternative, in further embodiments comprising cooling the compressed first portion of the first medium within the cooling circuit via the second medium.

In addition to one or more of the features described herein, or as an alternative, in further embodiments comprising cooling the compressed first portion of the first medium with the expanded second portion of the first medium.

In addition to one or more of the features described herein, or as an alternative, in further embodiments comprising moving the second medium through the cooling circuit via a fan, the fan being operably coupled to the compressor and the first turbine via the shaft.

In addition to one or more of the features described herein, or as an alternative, in further embodiments the vehicle is an aircraft.

In addition to one or more of the features described herein, or as an alternative, in further embodiments the first medium is a pressurized medium.

BRIEF DESCRIPTION OF THE DRAWINGS

The following descriptions should not be considered limiting in any way. With reference to the accompanying drawings, like elements are numbered alike:

The FIG. is a schematic diagram of a cooling system of a vehicle according to an embodiment.

DETAILED DESCRIPTION

A detailed description of one or more embodiments of the disclosed apparatus and method are presented herein by way of exemplification and not limitation with reference to the FIG.

With reference now to the FIG., an example of a schematic diagram of a portion of an environment control system (ECS) 20, such as an air conditioning unit or pack for example, is depicted according to a non-limiting embodiment. Although the environmental control system 20 is described with reference to an aircraft, alternative applications, such as another vehicle for example, are also within the scope of the disclosure. As shown, the ECS 20 may be configured to receive a first medium A1 at a first inlet 22 and may provide a conditioned form of the first medium A1 to a volume 24 during normal operation. In embodiments where the ECS 20 is used in an aircraft application, the first medium A1 is a pressurized flow. The first medium may be a flow of fresh air that has been pressurized in a cabin air compressor located upstream from the inlet 22. In other embodiments, the first medium A1 is bleed air, which is pressurized air originating from, i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

The ECS 20 may alternatively or additionally be configured to receive a second medium A2 at a second inlet 26. In an embodiment, the second medium A2 is fresh air, such as outside air for example. The outside air can be procured via one or more scooping mechanisms, such as an impact scoop or a flush scoop for example. Thus, the second inlet 26 can be considered a fresh or outside air inlet. In an embodiment, the second medium A2 is ram air drawn from a portion of a ram air circuit to be described in more detail below. Generally, the second medium A2 described herein is at an ambient pressure equal to an air pressure outside of the aircraft when the aircraft is on the ground and is between an ambient pressure and a cabin pressure when the aircraft is in flight.

As shown, the ECS 20 may include a cooling circuit 30 including a within which one or more heat exchangers are located. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers. The one or more heat exchangers arranged within the cooling circuit may be referred to as cooling heat exchangers. In the illustrated, non-limiting embodiment, the at least one cooling heat exchanger includes a first or primary heat exchanger 32 and a second or secondary heat exchanger 34. Within the heat exchangers 32, 34, the second medium A2 acts as a heat sink to cool a medium passing there through, for example the first medium A1. Although a cooling circuit 30 having only two heat exchangers 32, 34 is illustrated, it should be understood that embodiments having only a single heat exchanger, or alternatively, more than two heat exchangers are also contemplated herein. Further, although the cooling heat exchangers are illustrated as two separate components, embodiments where the primary and secondary heat exchangers are integrally formed or contained within a single unit are also contemplated herein.

The ECS 20 may additionally include at least one regeneration heat exchanger. In the illustrated, non-limiting embodiment, a first or primary regeneration heat exchanger 36 is arranged downstream from the primary heat exchanger 32 relative to a flow of the first medium A1. Alternatively, or in addition, a second or secondary regeneration heat exchanger 38 may be arranged downstream from the secondary heat exchanger relative to a flow of the first medium A1. Although the primary and secondary regenerative heat exchangers are illustrated as two separate components, embodiments where the primary and secondary regenerative heat exchangers are integrally formed or contained within a single unit are also contemplated herein. Further, it should be understood that embodiments where the primary heat exchanger 32 and the primary regeneration heat exchanger 36 are integrally formed or contained within a single unit and/or embodiments where the secondary heat exchanger 34 and the secondary regeneration heat exchanger 38 are integrally formed or contained within a single unit are also within the scope of the disclosure.

The ECS 20 additionally includes at least one thermodynamic device 40. The thermodynamic device 40 is a mechanical device that includes components for performing thermodynamic work on a medium (e.g., extracts work from or applies work to the first medium A1 and/or the second medium A2 by raising and/or lowering pressure and by raising and/or lowering temperature). Examples of a thermodynamic device 40 include an air cycle machine, a two-wheel air cycle machine, a three-wheel air cycle machine, a four-wheel air cycle machine, etc.

The thermodynamic device 40 may include a compressor 42 and at least one turbine operably coupled by a shaft 44. In the illustrated, non-limiting embodiment, the thermodynamic device 40 includes two turbines 46 and 48 mounted coaxially, to shaft 44. A compressor 42 is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. A turbine, such as turbines 46 and 48 for example, are mechanical devices that expand a medium and extracts work therefrom (also referred to as extracting energy) to drive the compressor 42 via the shaft 44. In an embodiment, the thermodynamic device 40 includes a fan 50. The fan 50 is a mechanical device that can force via push or pull methods air through the heat exchangers 32, 34 at a variable cooling to control temperatures.

The elements of the ECS 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the ECS 20 can be regulated to a desired value. For instance, a first valve V1 may be opened when the aircraft is on the ground to provide additional cooling to the regeneration heat exchangers. A second valve V2 is configured to control the temperature of the air provided to the cabin 24.

A method of operating the environmental control system 20 when the vehicle is in a first mode at a high altitude, such as during a supersonic cruise condition for example, is described. During operation of the ECS 20, the second medium A2 is provided to the inlet 26. As shown, the second medium A2 is provided to a cooled flow inlet 52 of the secondary heat exchanger 34. As will be described in more detail below, the second medium A2 is configured to cool a flow of the first medium A1 within the secondary heat exchanger 34. Accordingly, a temperature of the second medium A2 provided at the cooled flow outlet 54 of the secondary heat exchanger 34 is increased compared to that provided to the cooled flow inlet 52. The second medium A2 may be provided to the secondary heat exchanger 34 and the primary heat exchanger 32 in series, and in some embodiments, the primary heat exchanger 32 is arranged directly downstream from the cooled flow outlet 54 of the secondary heat exchanger 34. From the secondary heat exchanger 34, the second medium A2 is provided to the cooled flow inlet 56 of the primary heat exchanger 32. As will be described in more detail below, the second medium A2 is configured to cool a flow of the first medium A1 within the primary heat exchanger 32. Accordingly, a temperature of the second medium A2 provided at the cooled flow outlet 58 of the primary heat exchanger 32 is increased compared to that provided to the cooled flow inlet 56.

The fan 50 of the thermodynamic device 40 may be arranged in fluid communication with and positioned downstream from both the primary and the secondary heat exchangers 32, 34 relative to the flow of the second medium A2. In an embodiment, operation of the fan 50 is configured to draw the flow of the second medium A2 from the inlet 26 through the secondary heat exchanger 34 and the primary heat exchanger 32, respectively. Once the second medium A2 has passed through the fan 50, the second medium A2 may be exhausted overboard, or alternatively, may be provided to another system of the vehicle.

The pressurized first medium A1 provided to the first inlet 22, such as from a first source for example, is configured to flow to a heated flow inlet 60 of the primary heat exchanger 32. Within the primary heat exchanger 32, the hot pressurized medium A1 is arranged in a heat exchange relationship with the second medium A2. Because the second medium A2 is much cooler than the first medium A1 at the primary heat exchanger 32, heat is configured to transfer from the first medium A1 to the second medium A2 therein. Accordingly, the temperature of the first medium A1 at the heated flow outlet 62 of the primary heat exchanger 32 is less than at the heated flow inlet 60.

In the illustrated, non-limiting embodiment, the first medium A1 is configured to flow through the primary heat exchanger 32 and the primary regeneration heat exchanger 36 in series. Further, in some embodiments, the primary regeneration heat exchanger 36 is arranged directly downstream from the heated flow outlet 62 of the primary heat exchanger 32.

From the primary heat exchanger 32, the first medium A1 is provided to the heated flow inlet 64 of the primary regeneration heat exchanger 36. As will be described in more detail below, the first medium A1 is arranged in a heat exchange relationship with an expanded second portion A1$b$ of the first medium A1 at the primary regeneration heat exchanger 36. Accordingly, heat from the first medium A1 is transferred to the expanded first medium A1 within the primary regeneration heat exchanger 36.

The heated flow outlet 66 of the primary regeneration heat exchanger 36 is fluidly coupled to at least one wheel of the thermodynamic device 40. In the illustrated, non-limiting embodiment, the heated flow outlet 66 of the primary regeneration heat exchanger 36 is fluidly coupled to both the compressor 42 and the first turbine 46 of the thermodynamic device 40. Accordingly, downstream from the heated flow outlet 66 and upstream from the thermodynamic device 40, the flow of the first medium A1 is split into a first portion A1$a$ provided to an inlet 68 of the compressor 42 and a second portion A1$b$ provided to an inlet 70 of the first turbine 46.

Within the first turbine 46, the cool pressurized second portion A1$b$ of the first medium A1 is expanded across the first turbine 46 and work is extracted therefrom. This extracted work is used to drive the shaft 44, thereby driving the compressor 42, and also the fan 50 to move the second medium A2 through the primary heat exchanger 32 and the secondary heat exchanger 34 as previously described. From the outlet 72 of the first turbine 46, the expanded second portion A1$b$ of the first medium A1 is provided to a cooled flow inlet 74 of the secondary regeneration heat exchanger 38. Within the expanded second portion A1$b$ of the first medium A1 is configured to cool a flow of compressed first portion A1$a$ of the first medium A1 at the secondary regeneration heat exchanger 38. Therefore as a result of absorbing heat, the expanded second portion A1$b$ of the first medium A1 provided at the cooled flow outlet 76 of the secondary regeneration heat exchanger 38 is warmer than at the cooled flow inlet 74.

In the illustrated, non-limiting embodiment, the expanded second portion A1$b$ of the first medium A1 is configured to flow through the secondary regeneration heat exchanger 38 and the primary regeneration heat exchanger 36 in series. Further, in some embodiments, the primary regeneration heat exchanger 36 is arranged directly downstream from the cooled flow outlet 76 of the secondary regeneration heat exchanger 38 relative to the flow of the expanded second portion A1$b$ of the first medium A1. The expanded second portion A1$b$ of the first medium A1 provided to the cooled flow inlet 78 of the primary regeneration heat exchanger 36 is arranged in a heat exchange relationship with the first medium A1. Heat from the warm first medium A1 is configured to transfer to the expanded second portion A1$b$ of the first medium A1, thereby cooling the first medium A1. Accordingly, the temperature of the expanded second portion A1$b$ of the first medium A1 provided at the cooled flow outlet 80 of the primary regeneration heat exchanger 36 is greater than at the cooled flow inlet 78. From the cooled flow outlet 80, the expanded second portion A1$b$ of the first medium A1 may be exhausted overboard, or alternatively, may be provided to another system of the vehicle.

The cool pressurized first portion A1$a$ of the first medium A1 is provided to the compressor 42. The act of compressing the first portion A1$a$ of the first medium A1 heats the first portion A1$a$ to form a compressed first portion A1$a$ of the first medium A1. From the outlet 82 of the compressor 42, the compressed first portion A1$a$ of the first medium A1 is provided to a heated flow inlet 84 of the secondary heat exchanger 34. Within the secondary heat exchanger 34, the compressed first portion A1$a$ of the first medium A1 is cooled via a heat exchange relationship with the second medium A2. Accordingly, the temperature of the compressed first portion A1a of the first medium A1 provided at the heated flow outlet 86 of the secondary heat exchanger 34 is less than at the heated flow inlet 84.

From the secondary heat exchanger 34, the compressed first portion A1a of the first medium A1 is provided to the heated flow inlet 88 of the secondary regeneration heat exchanger 38. Within the secondary regeneration heat exchanger 38, the compressed first portion A1a of the first medium A1 is arranged in a heat exchange relationship with the expanded second portion A1b of the first medium A1. Because the compressed first portion A1a of the first medium A1 is hotter than the expanded second portion A1b of the first medium A1, heat transfers from the compressed first portion A1a of the first medium A1 to the expanded second portion A1b of the first medium A1.

From the heated flow outlet 90 of the secondary regeneration heat exchanger 38, the compressed first portion A1a of the first medium A1 is provided to a water extractor 92, where any free moisture is removed. The resulting cool, dry, compressed first portion A1a of the first medium A1 is then provided to the second turbine 48. Within the second turbine 48, the compressed second portion A1b of the first medium A1 is expanded and work is extracted therefrom. This extracted work is used to drive the shaft 44, thereby driving the compressor 42, and also the fan 50 to move the second medium A2 through the primary heat exchanger 32 and the secondary heat exchanger 34 as previously described. The resulting expanded first portion A1a of the first medium A1 output from the outlet of the second turbine 48 may then be delivered to one or more loads of the vehicle, such as to the cabin 24 for example.

An environmental control system 20 as illustrated and described herein is particularly beneficial in applications where the first medium A1 provided at the first inlet 22 of the ECS 20 is not sufficiently pressurized for delivery to one or more loads of the aircraft.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of a vehicle comprising:
    a first inlet configured to receive a flow of a first medium;
    a second inlet configured to receive a flow of a second medium;
    a thermodynamic device including a compressor and at least one turbine operably coupled by a shaft, wherein the compressor and the at least one turbine are fluidly coupled to the first inlet, the compressor and the at least one turbine being arranged in parallel relative to the flow of the first medium such that a first portion of the first medium is receivable at the compressor and a second portion of the first medium is receivable at the at least one turbine; and
    wherein the at least one turbine includes a first turbine and a second turbine, the compressor and the first turbine being arranged in parallel relative to the flow of the first medium, and the second turbine being arranged in series with the compressor relative to the first portion of the first medium.

2. The environmental control system of claim 1, further comprising an outlet fluidly connected with one or more loads of the vehicle, wherein only the first portion of the first medium is provided to the outlet.

3. The environmental control system of claim 1, further comprising a cooling circuit including at least one cooling heat exchanger, the cooling circuit being fluidly connected to the second inlet.

4. The environmental control system of claim 3, wherein the thermodynamic device further comprises a fan mounted to the shaft and the fan is operable to move the flow of the second medium through the cooling circuit.

5. The environmental control system of claim 3, wherein the at least one cooling heat exchanger further comprises a primary heat exchanger and a secondary heat exchanger, wherein a cooled flow inlet of the primary heat exchanger is arranged downstream from and is fluidly connected to a cooled flow outlet of the secondary heat exchanger relative to the flow of the second medium.

6. The environmental control system of claim 5, wherein a heated flow inlet of the secondary heat exchanger is arranged downstream from and is fluidly connected to a heated flow outlet of the primary heat exchanger relative to the flow of the first medium.

7. The environmental control system of claim 5, wherein a heated flow inlet of the secondary heat exchanger is arranged downstream from and is fluidly coupled to the compressor.

8. The environmental control system of claim 5, further comprising at least one regeneration heat exchanger arranged downstream from the at least one cooling heat exchanger relative to the flow of the first medium.

9. The environmental control system of claim 8, wherein the at least one regeneration heat exchanger further comprises a primary regeneration heat exchanger and a secondary regeneration heat exchanger, the primary regeneration heat exchanger being arranged downstream from the primary heat exchanger relative to the flow of the first medium, and the secondary regeneration heat exchanger being arranged downstream from the secondary heat exchanger relative to the flow of the first portion of the first medium.

10. The environmental control system of claim 1, wherein the vehicle is an aircraft.

11. The environmental control system of claim 1, wherein the vehicle is operable in a supersonic cruise condition.

12. A method of operating an environmental control system of a vehicle, the method comprising:
- providing a thermodynamic device including a compressor and a first turbine operably coupled by a shaft;
- cooling a first medium with a cooling circuit via a second medium, the second medium being moved through the cooling circuit via a fan operably coupled to compressor and the first turbine via the shaft;
- compressing a first portion of the first medium within the compressor to form a compressed first portion of the first medium;
- expanding a second portion of the first medium at the first turbine to form an expanded second portion of the first medium; and
- cooling the first medium with the expanded second portion of the first medium.

13. The method of claim 12, further comprising expanding the compressed first portion of the first medium at a second turbine to form an expanded first portion of the first medium, the second turbine being operably coupled to the compressor and the first turbine by the shaft.

14. The method of claim 13, further comprising providing only the expanded first portion of the first medium to at least one load of the vehicle via an outlet.

15. The method of claim 12, further comprising cooling the compressed first portion of the first medium within the cooling circuit via the second medium.

16. The method of claim 12, further comprising cooling the compressed first portion of the first medium with the expanded second portion of the first medium.

17. The method of claim 12, wherein the vehicle is an aircraft.

18. The method of claim 12, wherein the first medium is a pressurized medium.

19. An environmental control system of a vehicle comprising:
- a first inlet configured to receive a flow of a first medium;
- a second inlet configured to receive a flow of a second medium;
- a thermodynamic device including a compressor, at least one turbine, and a fan operably coupled by a shaft, wherein the compressor and the at least one turbine are fluidly coupled to the first inlet, the compressor and the at least one turbine being arranged in parallel relative to the flow of the first medium such that a first portion of the first medium is receivable at the compressor and a second portion of the first medium is receivable at the at least one turbine; and
- a cooling circuit including at least one cooling heat exchanger, the cooling circuit being fluidly connected to the second inlet, the fan being operable to move the flow of the second medium through the cooling circuit.

* * * * *